(12) United States Patent
Wu

(10) Patent No.: US 10,670,871 B2
(45) Date of Patent: Jun. 2, 2020

(54) THREE-DIMENSIONAL DISPLAY APPARATUS

(71) Applicant: BOE TECHNOLOGY GROUP CO., LTD., Beijing (CN)

(72) Inventor: Kun Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 394 days.

(21) Appl. No.: 15/541,409

(22) PCT Filed: Sep. 28, 2016

(86) PCT No.: PCT/CN2016/100661
§ 371 (c)(1),
(2) Date: Jul. 3, 2017

(87) PCT Pub. No.: WO2017/128753
PCT Pub. Date: Aug. 3, 2017

(65) Prior Publication Data
US 2018/0045968 A1 Feb. 15, 2018

(30) Foreign Application Priority Data
Jan. 26, 2016 (CN) .......................... 2016 1 0052314

(51) Int. Cl.
*G02B 27/02* (2006.01)
*G02B 5/18* (2006.01)
(Continued)

(52) U.S. Cl.
CPC ............. *G02B 27/022* (2013.01); *G02B 5/18* (2013.01); *G02B 27/42* (2013.01); *G02B 30/27* (2020.01); *G02B 27/0944* (2013.01)

(58) Field of Classification Search
CPC ............ G02B 27/0172; G02B 27/0101; G02B 2027/0178; G02B 27/017; G02B 27/0149;
(Continued)

(56) References Cited

U.S. PATENT DOCUMENTS

2006/0114561 A1 6/2006 Mashitani et al.
2007/0058113 A1 3/2007 Wu et al.
(Continued)

FOREIGN PATENT DOCUMENTS

CN 1619358 A 5/2005
CN 1695077 A 11/2005
(Continued)

OTHER PUBLICATIONS

Chinese Office Action dated Aug. 10, 2017.
International Search Report dated Dec. 23, 2016.

*Primary Examiner* — Collin X Beatty
*Assistant Examiner* — Grant A Gagnon
(74) *Attorney, Agent, or Firm* — Dilworth & Barrese, LLP.; Michael J. Musella, Esq.

(57) ABSTRACT

An embodiment of the present disclosure provides a three-dimensional display apparatus, including: a pixel structure formed by a plurality of sub-pixels, a three-dimensional grating formed by a plurality of strip gratings arranged along a row direction; wherein, the respective sub-pixels in each row of sub-pixels are aligned, the respective sub-pixels in every two adjacent rows of sub-pixels are staggered by a half width of the sub-pixel, in the row direction, and each sub-pixel is different in color from the respective sub-pixels adjacent thereto; the respective strip gratings have a same extension direction and have a certain inclination angle with respect to the row direction; and each strip grating corresponds to at least two sub-pixels, which display different viewpoint images, in each row of sub-pixels.

19 Claims, 6 Drawing Sheets

(51) Int. Cl.
*G02B 27/42* (2006.01)
*G02B 30/27* (2020.01)
*G02B 27/09* (2006.01)

(58) Field of Classification Search
CPC ............ G02B 2027/0123; G02B 27/01; G02B 2027/0187; G02B 2027/0118; G02B 2027/0127; G02B 2027/014; G02B 2027/015; G02B 27/0176; G02B 2027/011; G02B 2027/0138; G02B 27/0093; G02B 2027/0154; G02B 2027/0156; G02B 5/30; G02B 2027/0112; G02B 2027/0125; G02B 6/00; G02B 2027/0132; G02B 2027/0141; G02B 2027/0161; G02B 3/0006; G02B 2027/0134; G02B 2027/0152; G02B 2027/0169; G02B 2027/0174; G02B 26/10; G02B 5/02; G02B 5/18; G02B 2027/0121; G02B 25/001; G02B 27/0179; G02B 5/32; G02B 6/0031; G02B 17/0642; G02B 17/0663; G02B 2027/0114; G02B 2027/013; G02B 2027/0145; G02B 23/125; G02B 26/0833; G02B 27/0081; G02B 27/0103; G02B 27/141; G02B 27/144; G02B 27/283; G02B 5/04; G02B 5/10; G02B 6/0018; G02B 6/0035; G02B 6/0055; G02B 7/004; G02B 7/04; G02B 7/1822; G02B 17/006; G02B 17/02; G02B 17/0816; G02B 17/086; G02B 2027/012; G02B 2027/147; G02B 2027/0159; G02B 2027/0167; G02B 2027/0181; G02B 2027/0183; G02B 2027/0194; G02B 2027/0196; G02B 2027/0198; G02B 23/10; G02B 23/105; G02B 26/101; G02B 26/105; G02B 27/0006; G02B 27/0018; G02B 27/0025; G02B 27/0075; G02B 27/0189; G02B 27/022; G02B 27/1006; G02B 27/1073; G02B 27/1086; G02B 27/12; G02B 27/14; G02B 27/142; G02B 27/145; G02B 27/2214; G02B 27/2228; G02B 27/225; G02B 27/2278; G02B 27/24; G02B 27/286; G02B 27/4205; G02B 27/4272; G02B 27/44; G02B 27/48; G02B 3/0037; G02B 3/0043; G02B 3/0056; G02B 3/08; G02B 3/12; G02B 5/0242; G02B 5/0257; G02B 5/0278; G02B 5/045; G02B 5/085; G02B 5/1842; G02B 5/1847; G02B 5/1861; G02B 5/205; G02B 5/22; G02B 6/0033; G02B 6/0046; G02B 6/005; G02B 6/0065; G02B 6/0076; G02B 6/10; G02B 6/124; G02B 6/34; G02B 7/002; G02B 7/005; G02B 7/007; G02B 7/022; G02B 7/026; G02B 7/1821
USPC .......................................................... 359/630
See application file for complete search history.

(56) References Cited

U.S. PATENT DOCUMENTS

| | | | |
|---|---|---|---|
| 2015/0309319 A1 | 10/2015 | Wei | |
| 2016/0234488 A1 | 8/2016 | Zhao et al. | |
| 2017/0017088 A1 | 1/2017 | Wei | |

FOREIGN PATENT DOCUMENTS

| | | | |
|---|---|---|---|
| CN | 101995667 A | 3/2011 |
| CN | 102257828 A | 11/2011 |
| CN | 103278954 A | 9/2013 |
| CN | 103792607 A | 5/2014 |
| CN | 104460018 A | 3/2015 |
| CN | 104570370 A | 4/2015 |
| CN | 104614863 A | 5/2015 |
| CN | 104635398 A | 5/2015 |
| CN | 104933980 A | 9/2015 |
| CN | 105372823 A | 3/2016 |
| CN | 105572886 A | 5/2016 |

THREE-DIMENSIONAL DISPLAY APPARATUS

TECHNICAL FIELD

Embodiments of the present disclosure relate to a three-dimensional display apparatus.

BACKGROUND

Pixel design of a common display screen is Red Blue Green (RGB) or Red Green Blue White (RGBW) design, i.e., three sub-pixels or four sub-pixels constitute one pixel for display, and a visual resolution of the display screen is just a physical resolution. However, as customers demand higher and higher on visual perception of the display screen, the visual resolution (Pixels Per Inch, (PPI)) of the display screen needs to be increased continually. Currently, the physical resolution of the display screen is improved generally by reducing a pixel size. However, as the size of the pixel becomes smaller and smaller, the difficulty of a process for producing the display screen is higher and higher.

In order to improve the virtual resolution of display, currently, a technology of combining two sub-pixels into one pixel, i.e., a virtual display (Pentile) technology, has been developed. A principle of the technology is that a resolution on brightness in a human visual system is several times of a resolution on chroma is utilized, and by combining adjacent sub-pixels with a corresponding algorithm, display is carried out. The Pentile technology can achieve high resolution.

Currently, with rapid development of a three-dimensional display technology, a requirement for a three-dimensional display apparatus is higher and higher, and in numerous technologies for implementing three-dimensional display, naked eye three-dimensional stereoscopic display is very popular due to a case that a viewer does not need to wear glasses. When a three-dimensional grating for implementing naked eye stereoscopic display for general pixel design is applied to a pixel structure for implementing virtual display, a crosstalk problem and a problem of a Moire pattern phenomenon may be generated, so that a viewing effect of three-dimensional display is influenced largely.

SUMMARY

Embodiments of the present disclosure provide a three-dimensional display apparatus for reducing crosstalk and a Moire pattern phenomenon which are generated when a virtual pixel structure implements three-dimensional display.

An embodiment of the present disclosure provides a three-dimensional display apparatus, including: a pixel structure formed by a plurality of sub-pixels, a three-dimensional grating formed by a plurality of strip gratings arranged along a row direction; wherein the respective sub-pixels in each row of sub-pixels are aligned, the respective sub-pixels in every two adjacent rows of sub-pixels are staggered by a half width of the sub-pixel, in the row direction, and each sub-pixel is different in color from the respective sub-pixels adjacent thereto; the respective strip gratings have a same extension direction and have a certain inclination angle with respect to the row direction; and each strip grating corresponds to at least two sub-pixels, which display different viewpoint images, in each row of sub-pixels.

For example, in the three-dimensional display apparatus provided by the embodiment of the present disclosure, in each row of sub-pixels, every two sub-pixels constitute a square pixel unit, and a length-width ratio of each sub-pixel is 2:1; or, every 1.5 sub-pixels constitute a square pixel unit, and the length-width ratio of each sub-pixel is 3:2; or, each sub-pixel constitutes a square pixel unit, and the length-width ratio of each sub-pixel is 1:1.

For example, in the three-dimensional display apparatus provided by the embodiment of the present disclosure, the inclination angle between the extension direction of the strip gratings and the row direction is [70°, 80°].

For example, in the three-dimensional display apparatus provided by the embodiment of the present disclosure, the inclination angle between the extension direction of the strip gratings and the row direction is [71°, 77.5°].

For example, in the three-dimensional display apparatus provided by the embodiment of the present disclosure, an edge of each strip grating is a folded line and is positioned at a gap between two adjacent sub-pixels.

For example, in the three-dimensional display apparatus provided by the embodiment of the present disclosure, an edge of each strip grating is an oblique line with a direction same as the extension direction, and the oblique line divides each sub-pixel overlapped with the edge into two portions.

For example, in the three-dimensional display apparatus provided by the embodiment of the present disclosure, each divided sub-pixel is consistent in segmentation ratio.

For example, in the three-dimensional display apparatus provided by the embodiment of the present disclosure, the edge coincides with vertices, at a same position, of the respective sub-pixels overlapped with the edge.

For example, in the three-dimensional display apparatus provided by the embodiment of the present disclosure, when the length-width ratio of each sub-pixel is 3:2, the inclination angle between the extension direction of the strip gratings and the row direction is 71.57°.

For example, in the three-dimensional display apparatus provided by the embodiment of the present disclosure, a viewpoint image displayed by the respective sub-pixels in the pixel structure takes every ten rows of sub-pixels as one repeat unit.

For example, in the three-dimensional display apparatus provided by the embodiment of the present disclosure, the oblique line is divided according to maximization of a total segmentation ratio of each divided sub-pixel.

For example, in the three-dimensional display apparatus provided by the embodiment of the present disclosure, when the length-width ratio of each sub-pixel is 3:2, the inclination angle between the extension direction of the strip gratings and the row direction is 75.07° or 77.47°.

For example, in the three-dimensional display apparatus provided by the embodiment of the present disclosure, when the inclination angle is 75.07°, the viewpoint image displayed by respective sub-pixels in the pixel structure takes every 16 rows of sub-pixels as one repeat unit.

For example, in the three-dimensional display apparatus provided by the embodiment of the present disclosure, when the inclination angle is 75.07°, a viewpoint image displayed by respective sub-pixels in the pixel structure takes every 40 rows of sub-pixels as one repeat unit.

For example, in the three-dimensional display apparatus provided by the embodiment of the present disclosure, two adjacent rows of sub-pixels form one group, and in each group of sub-pixels, two sub-pixels adjacent in a column direction display the same viewpoint image.

For example, in the three-dimensional display apparatus provided by the embodiment of the present disclosure, corresponding to the strip grating overlapped with a portion occupying for a larger ratio, each divided sub-pixel displays viewpoint image.

For example, in the three-dimensional display apparatus provided by the embodiment of the present disclosure, each strip grating corresponds to five sub-pixels, which display different viewpoint images, in each row of sub-pixels.

For example, in the three-dimensional display apparatus provided by the embodiment of the present disclosure, in spaced apart rows of sub-pixels, respective sub-pixels are aligned in the column direction.

For example, in the three-dimensional display apparatus provided by the embodiment of the present disclosure, the three-dimensional grating is a lens grating, and the strip grating is of a lens structure; or, the three-dimensional grating is a slit grating, and the strip grating is a combination of a strip light-transmitting region and a strip light-shading region.

For example, in the three-dimensional display apparatus provided by the embodiment of the present disclosure, the three-dimensional grating is arranged on a light emergent side of the pixel structure; or, when the pixel structure is a liquid crystal pixel structure, the three-dimensional grating is arranged on a light incident side of the pixel structure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments of the disclosure herein, those skilled in the art can obtain other embodiment(s), without any inventive work, which should be within the scope of the disclosure.

Figure 1:
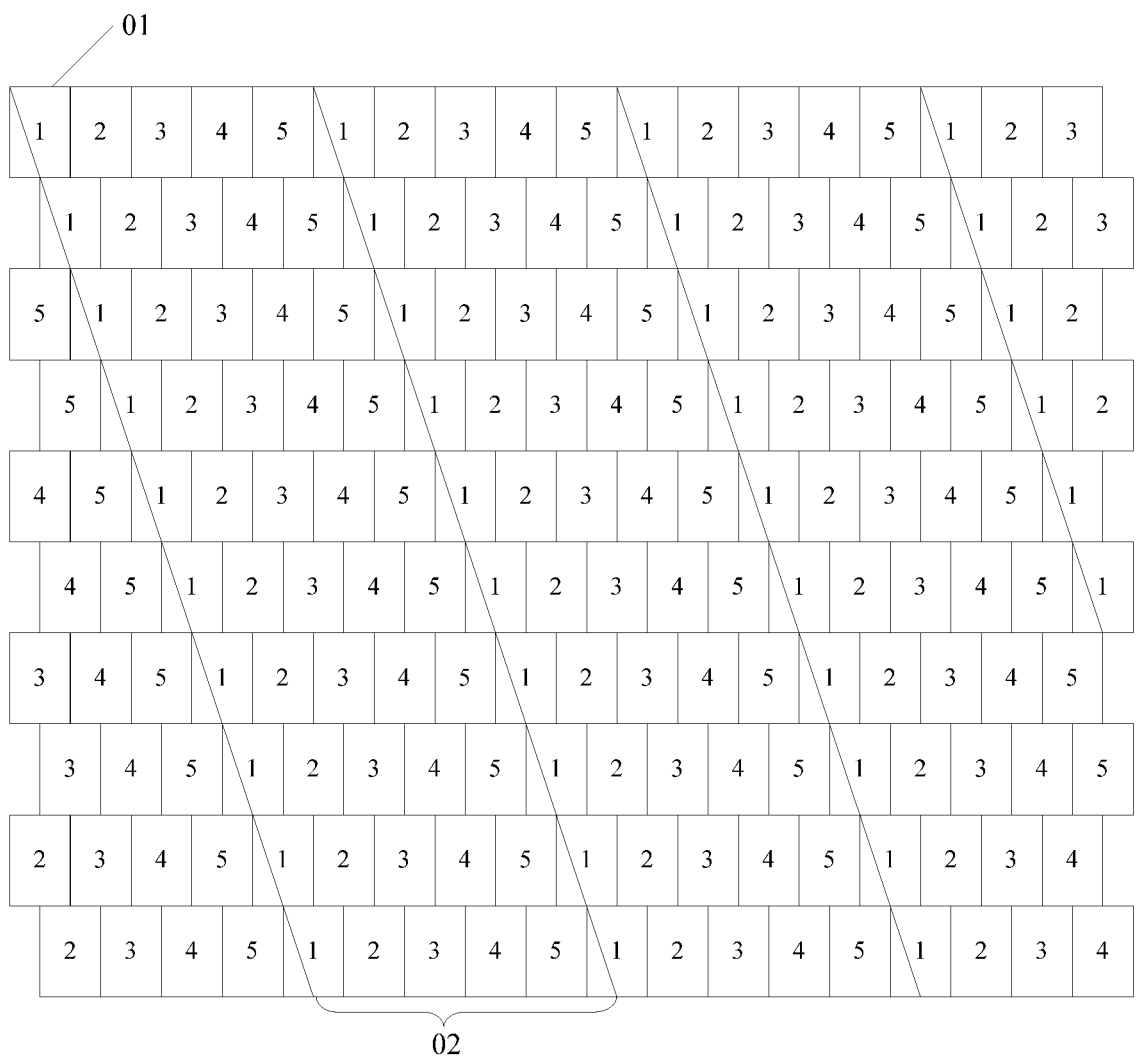
FIG. 1 is a structural schematic diagram of a three-dimensional display apparatus provided by an embodiment of the present disclosure.

An embodiment of the present disclosure provides a three-dimensional display apparatus. As shown in FIG. 1, the display apparatus includes: a pixel structure formed by a plurality of sub-pixels 01, and a three-dimensional grating formed by a plurality of strip gratings 02 arranged along a row direction.

Figure 2A:
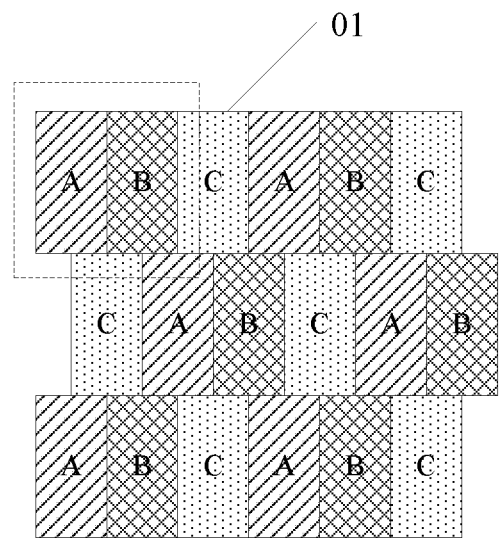
FIG. 2a to FIG. 2c are structural schematic diagrams of a pixel structure in the three-dimensional display apparatus provided by the embodiment of the present disclosure, respectively.
Figure 2B:
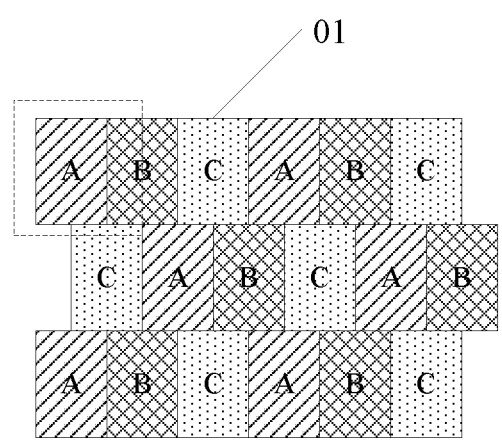
Figure 2C:
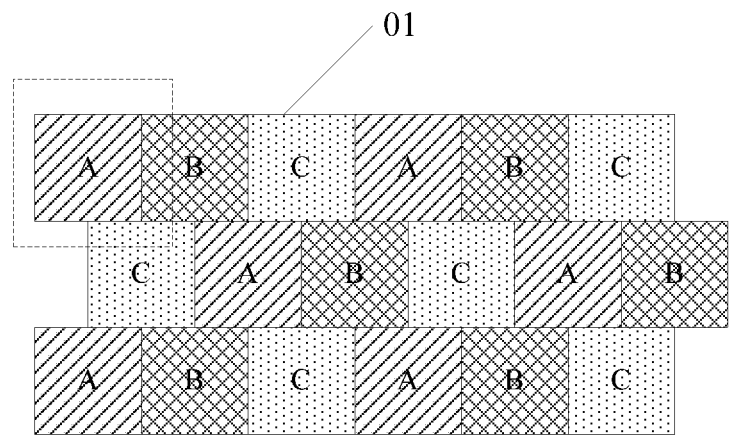

For example, FIG. 2a to FIG. 2c are structural schematic diagrams of the pixel structure in the three-dimensional display apparatus provided by the embodiment of the present disclosure. In each row of the sub-pixels 01, upper and lower edges of all the sub-pixels 01 are aligned, and the sub-pixels 01 are closely arranged in the row direction. In a column direction, two adjacent rows of sub-pixels are closely arranged in parallel. In every two adjacent rows of sub-pixels 01, the sub-pixels 01 are staggered by a half width of the sub-pixel, in the row direction, and each sub-pixel 01 is different in color from sub-pixels 01 adjacent thereto. That is, in the row direction or column direction, as long as two sub-pixels 01 are adjacent, the two sub-pixels 01 are different in color. For example, in FIG. 2a to FIG. 2c, A, B and C represent three different colors respectively.

Figure 3A:
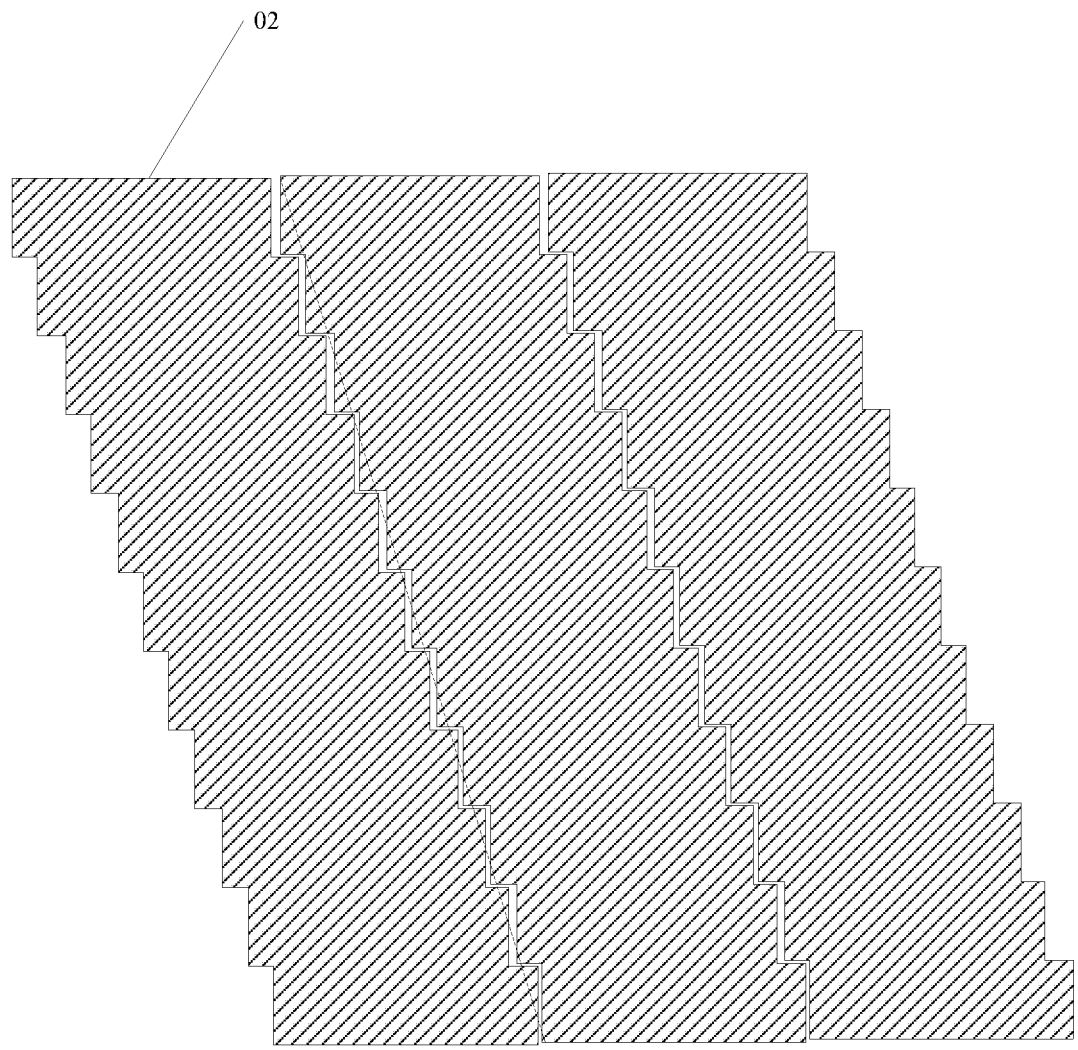
FIG. 3a and FIG. 3b are structural schematic diagrams of a three-dimensional grating in the three-dimensional display apparatus provided by the embodiment of the present disclosure, respectively.
Figure 3B:
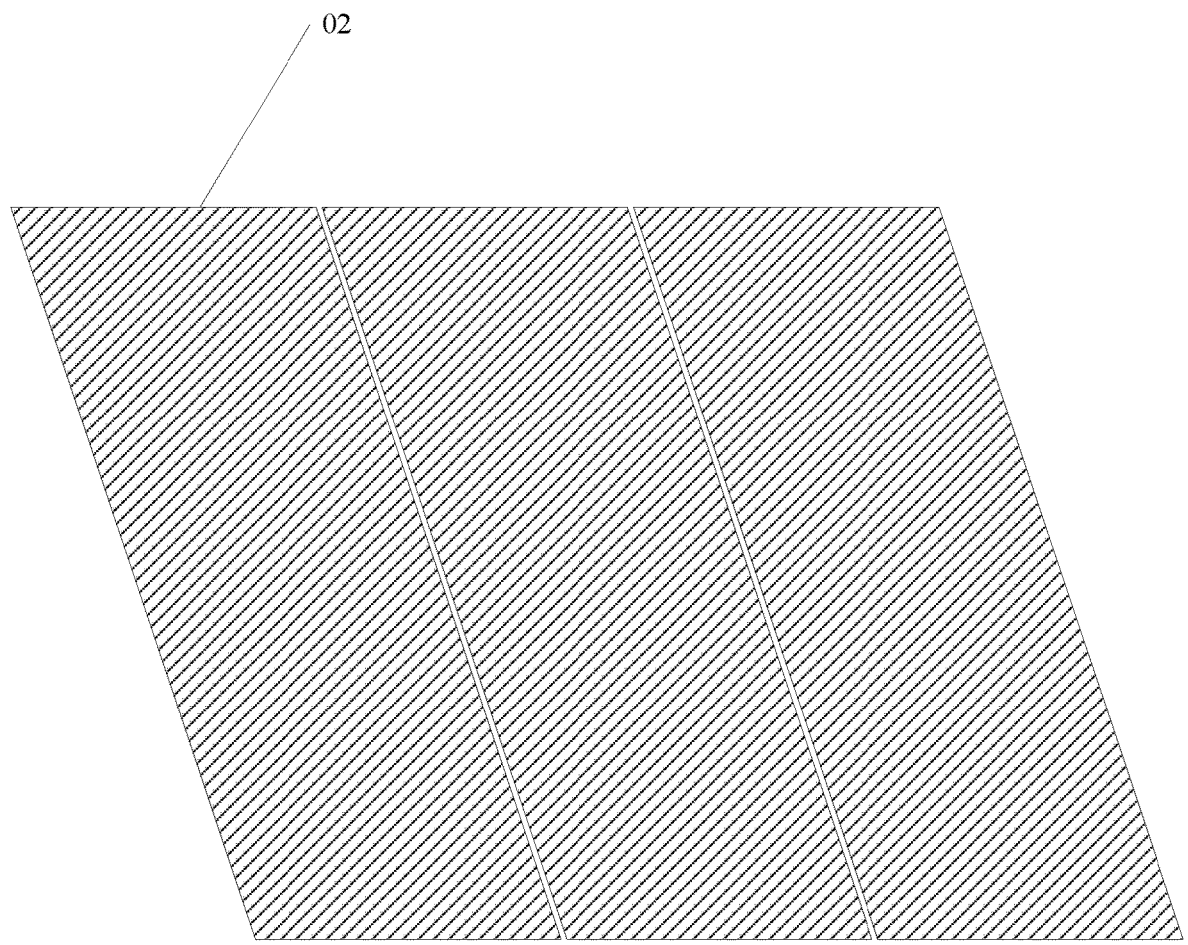

For example, FIG. 3a and FIG. 3b respectively are structural schematic diagrams of a three-dimensional grating in the three-dimensional display apparatus provided by the embodiment of the present disclosure. The respective strip gratings 02 have a same extension direction and have a certain inclination angle with respect to the row direction. Each strip grating at least corresponds to two sub-pixels 01 in the same row of sub-pixels 01, which display different viewpoint images.

In the three-dimensional display apparatus provided by the embodiment of the present disclosure, by adopting the inclined strip gratings 02 to match with the pixel structure of which each sub-pixel 01 is staggered by a half width of the sub-pixel, in the row direction, a ratio of the sub-pixels simultaneously covered by two adjacent strip gratings can be reduced, so that crosstalk and a Moire pattern phenomenon in the three-dimensional displaying process can be reduced, and a viewing effect of three-dimensional display is improved.

Further, in the pixel structure of the three-dimensional display apparatus provided by the embodiment of the present disclosure, as shown in FIG. 2a to FIG. 2c, the respective sub-pixels 01 in spaced apart rows of sub-pixels 01 are aligned in the column direction so as to ensure that the pixel structure is integrally of a rectangular structure. Moreover, the pixel structure of the three-dimensional display apparatus provided by the embodiment of the present disclosure is particularly applicable to a horizontal screen of which a length is greater than a width.

In the pixel structure of the three-dimensional display apparatus provided by the embodiment of the present disclosure, virtual pixel structure design can be adopted, at most two adjacent sub-pixels 01 constitute one square pixel unit, and then in the displaying process, the square pixel unit is matched with a virtual algorithm to implement virtual display. Thus, on the premise of not reducing a pixel size, selective opening of the sub-pixels 01 can be flexibly applied to display the same information with fewer pixels, so that an output resolution of a displayed image is improved. For example, as shown in FIG. 2a, in each row of sub-pixels 01, every two sub-pixels 01 constitute one square pixel unit (shown as a dashed box), and a length-width ratio of each sub-pixel 01 is 2:1; as shown in FIG. 2b, in each row of sub-pixels 01, every 1.5 sub-pixels 01 constitute one square pixel unit (shown as a dashed box), and the length-width ratio of each sub-pixel 01 is 3:2; and as shown in FIG. 2c, in each row of sub-pixels 01, each sub-pixel 01 constitutes one square pixel unit (shown as a dashed box), and the length-width ratio of each sub-pixel 01 is 1:1. Illustration will be carried out below by taking a case that as shown in FIG. 2b, the length-width ratio of each sub-pixel 01 is 3:2 as an example.

For example, when the inclination angle between the extension direction of the strip gratings 02 and the row direction is [70°, 80°], the three-dimensional display apparatus provided by the embodiment of the present disclosure can have an excellent effect of reducing the Moire pattern phenomenon. Further, the inclination angle between the extension direction of the strip grating 02 and a horizontal direction is preferably [71°, 77.5°]. Moreover, when designing the respective strip gratings 02 in the three-dimensional grating, an inclination direction of the strip grating 02 may be a leftward inclination direction as shown in FIG. 3a and FIG. 3b, or may be a rightward inclination direction, which is not limited herein. Illustration will be carried out below by taking a case that the strip grating 02 is inclined leftwards as an example.

For example, in the three-dimensional grating of the three-dimensional display apparatus provided by the embodiment of the present disclosure, one implementation mode is that: as shown in FIG. 3a, an edge of each strip grating 02 may be a folded line and be positioned at a position of a gap between two adjacent sub-pixels 01, i.e., the edge of the strip grating 02 does not segment the sub-pixel 01 into two portions, thereby avoiding the crosstalk problem, and when the strip gratings 02 are produced in a mode that the edge is the broken line, a requirement for production accuracy and a requirement for alignment accuracy are relatively high. In this case, the extension direction of each strip grating 02 is a direction of a connection line of vertexes of upper and lower ends in the strip grating 02 (shown as a dashed line in FIG. 3a).

For example, in the three-dimensional grating of the three-dimensional display apparatus provided by the embodiment of the present disclosure, another implementation mode is that: as shown in FIG. 3b, the edge of each strip grating 02 is an oblique line of which a direction is the same with the extension direction, and the oblique line divides each sub-pixel 01 overlapped with the edge into two portions.

After considering low crosstalk, low Moire pattern phenomenon and having an excellent continuous viewing angle, as shown in FIG. 1, each strip grating 02 simultaneously has low three-dimensional crosstalk, fewer Moire patterns and the excellent continuous viewing angle when corresponding to five sub-pixels 01 in each row of sub-pixels 01, which display different viewpoint images, wherein the five sub-pixels 01 respectively display five viewpoint images, and in FIGS. 1, 1, 2, 3, 4 and 5 represent five viewpoint images. For example, as shown in FIG. 1, in the same row of sub-pixels 01, 1, 2, 3, 4 and 5 represent viewpoint images displayed by different sub-pixels 01 covered by the same strip grating. In each row of sub-pixels 01, a viewpoint image displayed by an initial sub-pixel 01 may be different.

Illustration will be given by two examples below.

Figure 4:
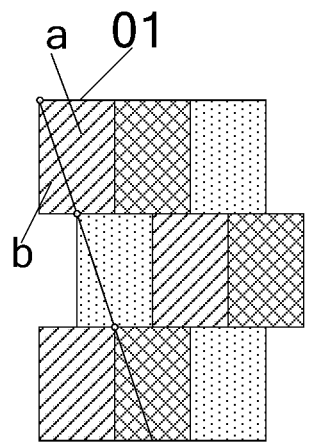
FIG. 4 is a schematic diagram of part of a pixel structure in Example I provided by an embodiment of the present disclosure.

Example I when the edge of each strip grating 02 is designed, as shown in FIG. 4, the edge of the strip grating 02 is designed to be an oblique line to divide each sub-pixel 01 overlapped with the edge into two portions, and each divided sub-pixel 01 is consistent in segmentation ratio. That is, after each sub-pixel 01 overlapped with the edge is divided into two portions a and b, in the respective sub-pixel 01, the portions a are of a same shape, and similarly, the portions b are also of a same shape. Each divided sub-pixel 01 theoretically, corresponding to the strip grating 02 overlapped with the portion occupying for a larger ratio to display the viewpoint image. For example, as shown in FIG. 4, the ratio occupied by the portion a is larger than that occupied by the portion b, so that the sub-pixel 01 corresponds to the strip grating 02 overlapped with the portion a, and belongs to the viewpoint image of the strip grating 02.

For example, in order to reduce crosstalk to the greatest extent, an area ratio of two portions a and b into which each sub-pixel 01 is divided to be as great as possible. As shown in FIG. 4, the edge of the oblique line coincides with vertices, at a same position, in the respective sub-pixels 01 overlapped with the edge. In FIG. 4, the edge of the oblique line coincides with a top left vertex of each sub-pixel 01 overlapped with the edge.

For example, in the three-dimensional display apparatus provided by the embodiment of the present disclosure, when the length-width ratio of each sub-pixel 01 is 3:2, the inclination angle between the extension direction of the strip grating 02 and the row horizontal direction is 71.57°. The viewpoint image displayed by the respective sub-pixels in the pixel structure takes every ten rows of sub-pixels as one repeat unit. For example, every two adjacent rows of sub-pixels form one group, and in each group, two sub-pixels adjacent in the column direction display the same viewpoint image. By taking a case that one strip grating 02 corresponds to five sub-pixels 01 in each row of sub-pixels 01 as an example, in each row of sub-pixels 01, the viewpoint images displayed by the sub-pixels 01 corresponding to the same one strip grating are arranged in a sequence of 1, 2, 3, 4 and 5. The viewpoint image displayed by the initial sub-pixel 01 in each row is displayed in a mode that every two rows form one repeat unit as shown in Table 1 below. According to FIG. 1, the following table can be obtained.

TABLE 1

| | The number of Rows | | | | | | | | | |
|---|---|---|---|---|---|---|---|---|---|---|
| | 1 | 2 | 3 | 4 | 5 | 6 | 7 | 8 | 9 | 10 |
| Viewpoint Image | 1 | 1 | 5 | 5 | 4 | 4 | 3 | 3 | 2 | 2 |

Figure 5:
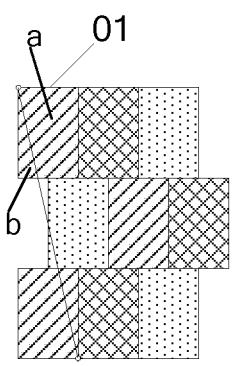
FIG. 5 and FIG. 6 respectively are schematic diagrams of part of a pixel structure in Example II provided by an embodiment of the present disclosure.
Figure 6:
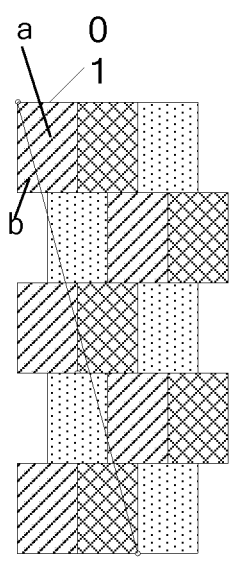

Example II when the edge of the respective strip grating 02 is designed, as shown in FIG. 5 and FIG. 6, the edge is designed as the oblique line according to maximization of a total segmentation ratio of each divided sub-pixel 01 for division, That is, by dividing the respective sub-pixels 01 overlapped with the edge, a total ratio of a sum of the portions a with larger area to a sum of the portions b with smaller area is as great as possible.

For example, as shown in FIG. 5, the edge of the strip grating 02 is set by a connection line of diagonal vertices of two sub-pixels 01 aligned in the column direction at an interval of one row. When the length-width ratio of each sub-pixel 01 is 3:2, the inclination angle between the extension direction of the strip grating 02 and the horizontal direction is 77.47°. In this case, the viewpoint image displayed by respective sub-pixels in the pixel structure takes every 16 rows of sub-pixels as one repeat unit, and further, every two adjacent rows of sub-pixels form one group, and in each group, two sub-pixels adjacent in the column direction display the same viewpoint image. By taking a case that one strip grating 02 corresponds to five sub-pixels 01 in each row of sub-pixels 01 as an example, in each row of sub-pixels 01, the viewpoint images displayed by all the sub-pixels 01 corresponding to the same strip grating structure are arranged in a sequence of 1, 2, 3, 4 and 5. The viewpoint image displayed by the initial sub-pixel 01 in each row is displayed in a mode that each 16 rows form one repeat unit as shown in Table 2 below.

TABLE 2

| | Number of Rows | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Viewpoint Image | 1 | 1 | 5 | 5 | 4 | 4 | 4 | 4 | 3 | 3 | 2 | 2 | 2 | 2 | 1 | 1 |

For example, as shown in FIG. 6, the edge of the strip grating 02 is set by a connection line of diagonal vertices of two sub-pixels 01 arranged at an interval of three rows in the column direction. In this case, the length-width ratio of each sub-pixel 01 is 3:2, and the inclination angle between the extension direction of the strip grating 02 and the horizontal direction is 75.07°. For example, the viewpoint image displayed by respective sub-pixels in the pixel structure takes every 40 rows of sub-pixels as one repeat unit, and further, each two adjacent rows of sub-pixels form one group, and in each group, two sub-pixels adjacent in the column direction display the same viewpoint image. By taking a case that one strip grating 02 corresponds to five sub-pixels 01 in each row of sub-pixels 01 as an example, in each row of sub-pixels 01, the viewpoint images displayed by all the sub-pixels 01 corresponding to the same strip grating structure are arranged in a sequence of 1, 2, 3, 4 and 5. The viewpoint image displayed by the initial sub-pixel 01 in each row is displayed in a mode that each 40 rows form one repeat unit as shown in Table 3 below.

TABLE 3

| | Number of Rows | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Viewpoint Image | 1 | 1 | 5 | 5 | 4 | 4 | 3 | 3 | 3 | 3 | 2 | 2 | 1 | 1 |

| | Number of Rows | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Viewpoint Image | 5 | 5 | 5 | 5 | 4 | 4 | 3 | 3 | 2 | 2 | 2 | 2 | 1 | 1 |

| | Number of Rows | | | | | | | | | | | |
|---|---|---|---|---|---|---|---|---|---|---|---|---|
| | 29 | 30 | 31 | 32 | 33 | 34 | 35 | 36 | 37 | 38 | 39 | 40 |
| Viewpoint Image | 5 | 5 | 4 | 4 | 4 | 4 | 3 | 3 | 2 | 2 | 1 | 1 |

For example, in the three-dimensional display apparatus provided by the embodiment of the present disclosure, the three-dimensional grating, for example, may be a lens grating; correspondingly, each strip grating 02 constituting the three-dimensional grating is of a lens structure; and for example, a lens function of the three-dimensional grating can be achieved by adopting a liquid crystal lens. Or, in the three-dimensional display apparatus provided by the embodiment of the present disclosure, the three-dimensional grating may be a slit grating, and for example, each strip grating 02 constituting the three-dimensional grating is a combination of a strip light-transmitting region and a strip light-shading region, i.e., one strip grating 02 consists of one strip light-transmitting region and one strip light-shading region, and extension directions of the strip light-transmitting region and the strip light-shading region are consistent with that of the strip grating 02.

For example, in the three-dimensional display apparatus provided by the embodiment of the present disclosure, the three-dimensional grating and the pixel structure have a relationship in layer level: the three-dimensional grating may be arranged on a light emergent side of the pixel structure; or, when the pixel structure is a liquid crystal pixel structure, the three-dimensional grating may also be arranged on a light incident side of the pixel structure, and meanwhile, functioning as backlight source.

The embodiment of the present disclosure provides the three-dimensional display apparatus. The three-dimensional display apparatus includes: the pixel structure formed by a plurality of sub-pixels, and the three-dimensional grating formed by a plurality of strip gratings arranged along the row direction, wherein each sub-pixel in each row of sub-pixels aligned, each sub-pixel in each two adjacent rows of sub-pixels is staggered by a half width of the sub-pixel, in the row direction, and each sub-pixel is different in color from the respective sub-pixel adjacent thereto; the strip gratings have a same extension direction and have a certain inclination angle with respect to the row direction; and each strip grating corresponds to at least two sub-pixels in each row of sub-pixels, which display different viewpoint images. By adopting the inclined strip gratings 02 to match with the pixel structure of which each sub-pixel is staggered by a half width of the sub-pixel, in the row direction, the ratio of the sub-pixels simultaneously covered by two adjacent strip gratings can be reduced, so that crosstalk and the Moire pattern phenomenon in the three-dimensional displaying process are reduced, and the viewing effect of three-dimensional display is improved.

It is evident that one person skilled in the art can make various changes or modifications to the present disclosure without departure from the spirit and scope of the disclosure. Thus, if these changes or modifications to the present disclosure are within the scope of the claims of the present disclosure and equivalent technologies, the present disclosure also intends to include all such changes and modifications within its scope.

The foregoing embodiments merely are exemplary embodiments of the disclosure, and not intended to define the scope of the disclosure, and the scope of the disclosure is determined by the appended claims.

The present application claims priority of Chinese Patent Application No. 201610052314.5 filed on Jan. 26, 2016, the disclosure of which is incorporated herein by reference in its entirety as part of the present application.

The invention claimed is:

1. A three-dimensional display apparatus, comprising:
a pixel structure formed by a plurality of sub-pixels,
a three-dimensional grating formed by a plurality of strip gratings arranged along a row direction; wherein
the respective sub-pixels in each row of sub-pixels are aligned, the respective sub-pixels in every two adjacent rows of sub-pixels are staggered in the row direction by a half width of the sub-pixel, and each sub-pixel is different in color from the respective sub-pixels adjacent thereto;
the respective strip gratings have a same extension direction and have a certain inclination angle with respect to the row direction; and each strip grating corresponds to at least two sub-pixels, which display different viewpoint images, in each row of sub-pixels,
an edge of each strip grating is an oblique line with a direction same as the extension direction, and the oblique line divides each sub-pixel overlapped with the edge into two portions, and
the oblique line passes through two sides of the sub-pixel overlapped with the edge, the two sides of the sub-pixel overlapped with the edge are opposite to each other in a column direction, the oblique line is intersected with one of the two sides at a vertex of the sub-pixel, and the oblique line is intersected with the other of the two sides at a middle point of the side.

2. The three-dimensional display apparatus according to claim 1, wherein
in each row of sub-pixels, every two sub-pixels constitute a square pixel unit, and a length-width ratio of each sub-pixel is 2:1; or, every 1.5 sub-pixels constitute a square pixel unit, and the length-width ratio of each sub-pixel is 3:2; or, each sub-pixel constitutes a square pixel unit, and the length-width ratio of each sub-pixel is 1:1.

3. The three-dimensional display apparatus according to claim 1, wherein in spaced apart rows of sub-pixels, respective sub-pixels are aligned in the column direction.

4. The three-dimensional display apparatus according to claim 1, wherein the three-dimensional grating is a lens grating, and the strip grating is of a lens structure; or, the three-dimensional grating is a slit grating, and the strip grating is a combination of a strip light-transmitting region and a strip light-shading region.

5. The three-dimensional display apparatus according to claim 4, wherein the three-dimensional grating is arranged on a light emergent side of the pixel structure; or, when the pixel structure is a liquid crystal pixel structure, the three-dimensional grating is arranged on a light incident side of the pixel structure.

6. The three-dimensional display apparatus according to claim 1, wherein the inclination angle between the extension direction of the strip gratings and the row direction is [70°, 80°].

7. The three-dimensional display apparatus according to claim 6, wherein the inclination angle between the extension direction of the strip gratings and the row direction is [71°, 77.5°].

8. The three-dimensional display apparatus according to claim 7, wherein an edge of each strip grating is a folded line and is positioned at a gap between two adjacent sub-pixels.

9. The three-dimensional display apparatus according to claim 1, wherein corresponding to the strip grating overlapped with a portion occupying for a larger ratio, each divided sub-pixel displays viewpoint image.

10. The three-dimensional display apparatus according to claim 9, wherein each strip grating corresponds to five sub-pixels, which display different viewpoint images, in each row of sub-pixels.

11. The three-dimensional display apparatus according to claim 1, wherein the oblique line is divided according to maximization of a total segmentation ratio of each divided sub-pixel.

12. The three-dimensional display apparatus according to claim 11, wherein when the length-width ratio of each sub-pixel is 3:2, the inclination angle between the extension direction of the strip gratings and the row direction is 75.07° or 77.47°.

13. The three-dimensional display apparatus according to claim 12, wherein when the inclination angle is 75.07°, the viewpoint image displayed by respective sub-pixels in the pixel structure takes every 16 rows of sub-pixels as one repeat unit.

14. The three-dimensional display apparatus according to claim 12, wherein when the inclination angle is 75.07°, a viewpoint image displayed by respective sub-pixels in the pixel structure takes every 40 rows of sub-pixels as one repeat unit.

15. The three-dimensional display apparatus according to claim 1, wherein each divided sub-pixel is consistent in segmentation ratio.

16. The three-dimensional display apparatus according to claim 15, wherein the edge coincides with vertices, at a same position, of the respective sub-pixels overlapped with the edge.

17. The three-dimensional display apparatus according to claim 15, wherein when the length-width ratio of each sub-pixel is 3:2, the inclination angle between the extension direction of the strip gratings and the row direction is 71.57°.

18. The three-dimensional display apparatus according to claim 17, wherein a viewpoint image displayed by the respective sub-pixels in the pixel structure takes every ten rows of sub-pixels as one repeat unit.

19. The three-dimensional display apparatus according to claim 18, wherein two adjacent rows of sub-pixels form one group, and in each group of sub-pixels, two sub-pixels adjacent in the column direction display the same viewpoint image.

* * * * *